(12) United States Patent
Pendergrass et al.

(10) Patent No.: US 8,572,994 B2
(45) Date of Patent: Nov. 5, 2013

(54) SYSTEMS AND METHODS FOR OPERATING AND MONITORING DEHUMIDIFIERS

(75) Inventors: Robert Pendergrass, Sedro-Woolley, WA (US); Matthew Miller, Bellingham, WA (US); Tom Schnelle, Anacortes, WA (US); Larry White, Mountlake Terrace, WA (US)

(73) Assignee: Dri-Eaz Products, Inc., Burlington, WA (US)

( * ) Notice: Subject to any disclaimer, the term of this patent is extended or adjusted under 35 U.S.C. 154(b) by 813 days.

(21) Appl. No.: 12/767,526

(22) Filed: Apr. 26, 2010

(65) Prior Publication Data
US 2010/0269526 A1  Oct. 28, 2010

Related U.S. Application Data

(60) Provisional application No. 61/173,128, filed on Apr. 27, 2009.

(51) Int. Cl.
*G05D 22/00* (2006.01)
*F25D 17/04* (2006.01)

(52) U.S. Cl.
USPC ............... 62/176.6; 62/186; 236/44 C

(58) Field of Classification Search
USPC .......... 62/176.1, 176.6, 186; 236/44 A, 44 C
See application file for complete search history.

(56) References Cited

U.S. PATENT DOCUMENTS

| | | | |
|---|---|---|---|
| 1,690,108 A | 11/1928 | Grady | |
| 1,870,457 A | 8/1932 | Kenney | |
| 1,894,026 A | 1/1933 | Deny | |
| 2,093,725 A | 9/1937 | Hull | |
| 2,130,092 A | 9/1938 | Kettering | |
| 2,188,975 A | 2/1940 | Herz | |
| 2,623,364 A | 12/1952 | Munters | |
| D171,429 S | 2/1954 | Thompson | |
| 2,719,596 A | 10/1955 | Kent et al. | |
| 2,758,390 A | 8/1956 | Munters | |
| 2,886,956 A | 5/1959 | Loveley | |
| 2,905,851 A | 9/1959 | Caussin | |
| 2,932,178 A | 4/1960 | Armstrong et al. | |
| 2,959,036 A | 11/1960 | Mehalick | |
| 2,975,609 A | 3/1961 | Allander et al. | |

(Continued)

FOREIGN PATENT DOCUMENTS

| CN | 1046384 A | 10/1990 |
|---|---|---|
| EP | 0046528 A1 | 3/1982 |

(Continued)

OTHER PUBLICATIONS

U.S. Appl. No. 29/360,550, filed Apr. 27, 2010, Wolfe et al.

(Continued)

*Primary Examiner* — Marc Norman
(74) *Attorney, Agent, or Firm* — Perkins Coie LLP

(57) ABSTRACT

Systems and methods of automatically operating dehumidifiers in response to dehumidifier operating conditions are disclosed herein. A method of operating a dehumidifier configured in accordance with one embodiment includes directing air flow through the dehumidifier at a first volumetric flow rate while the dehumidifier is operating at a first operating condition. The method further includes changing the first volumetric flow rate to a second volumetric flow rate when the first operating condition of the dehumidifier changes to a predetermined second operating condition.

24 Claims, 10 Drawing Sheets

(56) References Cited

U.S. PATENT DOCUMENTS

| | | |
|---|---|---|
| 3,000,193 A | 9/1961 | Crider |
| 3,035,419 A | 5/1962 | Wigert |
| 3,097,507 A | 7/1963 | Makuh |
| 3,141,762 A | 7/1964 | Serck-Hanssen |
| 3,149,479 A | 9/1964 | Peterson |
| D212,777 S | 11/1968 | Anderson |
| 3,621,906 A | 11/1971 | Leffert |
| 3,623,549 A | 11/1971 | Smith, Jr. |
| 3,807,493 A | 4/1974 | Stewart |
| 3,820,581 A | 6/1974 | Machida et al. |
| 3,877,518 A | 4/1975 | Dreksler |
| 3,968,833 A | 7/1976 | Strindehag et al. |
| 4,000,779 A | 1/1977 | Irwin |
| 4,044,820 A | 8/1977 | Nobles |
| 4,091,547 A | 5/1978 | Leigh |
| 4,176,525 A | 12/1979 | Tucker et al. |
| 4,183,399 A | 1/1980 | Seehausen |
| 4,189,848 A | 2/1980 | Ko et al. |
| D254,566 S | 3/1980 | Cummins |
| 4,259,268 A | 3/1981 | DiRoss |
| 4,280,483 A | 7/1981 | Schaffer |
| 4,295,342 A | 10/1981 | Parro |
| 4,333,517 A | 6/1982 | Parro |
| 4,428,207 A | 1/1984 | Hall |
| 4,452,051 A | 6/1984 | Berger et al. |
| 4,502,286 A | 3/1985 | Okada et al. |
| 4,546,820 A | 10/1985 | Whipple |
| 4,607,498 A | 8/1986 | Dinh |
| 4,615,383 A | 10/1986 | Hisao |
| 4,628,696 A | 12/1986 | Rodgers |
| 4,724,901 A | 2/1988 | Munekawa |
| 4,771,824 A | 9/1988 | Rojey et al. |
| 4,827,733 A | 5/1989 | Dinh |
| 4,921,041 A | 5/1990 | Akachi |
| D308,414 S | 6/1990 | Makihara |
| 4,938,035 A | 7/1990 | Dinh |
| 4,942,740 A | 7/1990 | Shaw et al. |
| D310,412 S | 9/1990 | Fukumoto et al. |
| 4,971,139 A | 11/1990 | Khattar |
| 5,031,411 A | 7/1991 | Gehring et al. |
| 5,033,539 A | 7/1991 | Kohtaka |
| 5,050,109 A | 9/1991 | Ladd |
| D325,252 S | 4/1992 | Morris et al. |
| 5,115,645 A | 5/1992 | Abraham |
| 5,117,651 A | 6/1992 | Suh |
| D333,890 S | 3/1993 | Oberdorfer-Bogel |
| D334,258 S | 3/1993 | Oberdorfer-Bogel |
| 5,219,020 A | 6/1993 | Akachi |
| D337,592 S | 7/1993 | Hider et al. |
| 5,265,895 A | 11/1993 | Barrett |
| 5,269,151 A | 12/1993 | Dinh |
| D343,706 S | 1/1994 | Gurstein |
| 5,301,515 A | 4/1994 | Iritani et al. |
| 5,303,561 A * | 4/1994 | Bahel et al. ............... 62/186 |
| 5,333,470 A | 8/1994 | Dinh |
| 5,394,040 A | 2/1995 | Khanh |
| 5,404,938 A | 4/1995 | Dinh |
| D361,178 S | 8/1995 | Piret |
| 5,443,624 A | 8/1995 | Claesson |
| 5,448,897 A | 9/1995 | Dinh |
| D364,947 S | 12/1995 | Kent et al. |
| D368,770 S | 4/1996 | Tanner et al. |
| 5,548,905 A | 8/1996 | Kuma et al. |
| 5,564,184 A | 10/1996 | Dinh |
| 5,582,246 A | 12/1996 | Dinh |
| D379,016 S | 4/1997 | Wilson |
| 5,634,353 A | 6/1997 | Hallin et al. |
| 5,649,372 A | 7/1997 | Souza |
| 5,684,672 A | 11/1997 | Karidis et al. |
| 5,736,647 A | 4/1998 | Matsubara et al. |
| D394,499 S | 5/1998 | Bettag et al. |
| 5,746,061 A | 5/1998 | Kramer |
| 5,749,415 A | 5/1998 | Dinh |
| D395,492 S | 6/1998 | Phillips et al. |
| 5,785,723 A | 7/1998 | Beran et al. |
| 5,794,453 A | 8/1998 | Barnwell |
| D402,021 S | 12/1998 | Allen et al. |
| 5,845,702 A | 12/1998 | Dinh |
| 5,890,368 A | 4/1999 | Lakdawala |
| 5,901,565 A | 5/1999 | Morton, Jr. |
| 5,921,315 A | 7/1999 | Dinh |
| 5,950,439 A | 9/1999 | Peterson et al. |
| 5,953,831 A | 9/1999 | Yu |
| 5,953,926 A | 9/1999 | Dressler et al. |
| 5,992,161 A | 11/1999 | O'Halloran et al. |
| D419,230 S | 1/2000 | Ciccone |
| D420,473 S | 2/2000 | Shero |
| 6,021,644 A | 2/2000 | Ares et al. |
| 6,029,464 A | 2/2000 | Kil et al. |
| 6,030,426 A | 2/2000 | Stopyra et al. |
| 6,035,551 A | 3/2000 | Scheufler et al. |
| D422,351 S | 4/2000 | Griffin |
| D422,386 S | 4/2000 | Jaros et al. |
| D426,473 S | 6/2000 | Blackburn |
| 6,101,815 A | 8/2000 | van Oort et al. |
| 6,105,278 A | 8/2000 | Gerrish et al. |
| D441,161 S | 4/2001 | Shetterly |
| 6,223,543 B1 | 5/2001 | Sandelman |
| 6,237,352 B1 | 5/2001 | Goodchild |
| D445,116 S | 7/2001 | Evans et al. |
| D446,612 S | 8/2001 | Kohler |
| D453,560 S | 2/2002 | Van Brunt |
| 6,447,586 B1 | 9/2002 | Campbell |
| D465,018 S | 10/2002 | Gustafsson et al. |
| 6,463,794 B1 | 10/2002 | Moshe et al. |
| 6,542,062 B1 | 4/2003 | Herrick |
| D480,467 S | 10/2003 | White |
| D482,171 S | 11/2003 | Vui et al. |
| 6,644,060 B1 | 11/2003 | Dagan |
| 6,796,896 B2 | 9/2004 | Laiti |
| D500,848 S | 1/2005 | Holderfield et al. |
| 6,895,774 B1 | 5/2005 | Ares et al. |
| D508,735 S | 8/2005 | Klein |
| 6,941,763 B2 | 9/2005 | Maeda et al. |
| D515,190 S | 2/2006 | Bartholmey et al. |
| D529,019 S | 9/2006 | Lim |
| 7,194,870 B2 | 3/2007 | O'Brien et al. |
| 7,228,693 B2 | 6/2007 | Helt |
| 7,246,503 B1 | 7/2007 | O'Brien et al. |
| 7,281,389 B1 | 10/2007 | O'Brien et al. |
| D565,269 S | 3/2008 | Tomasiak et al. |
| D572,356 S | 7/2008 | Harber |
| D577,426 S | 9/2008 | Huang |
| D581,111 S | 11/2008 | DiPasquale |
| D581,608 S | 11/2008 | Dammkoehler et al. |
| D612,032 S | 3/2010 | Gildersleeve et al. |
| D617,437 S | 6/2010 | Matsuzaki |
| 7,856,840 B2 | 12/2010 | Yoon et al. |
| D634,414 S | 3/2011 | Wolfe et al. |
| D641,844 S | 7/2011 | Kim et al. |
| D641,845 S | 7/2011 | Breit et al. |
| 8,056,182 B2 | 11/2011 | Day |
| 8,127,397 B2 | 3/2012 | Hess et al. |
| 2001/0045098 A1 | 11/2001 | Derryberry et al. |
| 2003/0034573 A1 | 2/2003 | Mulvaney |
| 2005/0011255 A1 | 1/2005 | Weisenberger et al. |
| 2005/0011962 A1 | 1/2005 | Weisenberger et al. |
| 2005/0066538 A1 | 3/2005 | Goldberg et al. |
| 2005/0183430 A1 | 8/2005 | McMillan et al. |
| 2006/0214315 A1 | 9/2006 | Williams |
| 2007/0012060 A1 | 1/2007 | Simons |
| 2007/0107450 A1 | 5/2007 | Sasao et al. |
| 2008/0028776 A1 | 2/2008 | O'Brien et al. |
| 2008/0202131 A1 | 8/2008 | Brody |
| 2008/0223050 A1 | 9/2008 | Bruders et al. |
| 2009/0007367 A1 | 1/2009 | Archbold |
| 2009/0101727 A1 | 4/2009 | Boudreau |
| 2010/0125367 A1 | 5/2010 | Burton et al. |

(56) References Cited

U.S. PATENT DOCUMENTS

| | | |
|---|---|---|
| 2011/0061408 A1 | 3/2011 | Schnelle |
| 2013/0047662 A1 | 2/2013 | Black et al. |

FOREIGN PATENT DOCUMENTS

| | | |
|---|---|---|
| EP | 830554 A1 | 3/1998 |
| EP | 893657 A1 | 1/1999 |
| FR | 2687464 A1 | 8/1993 |
| GB | 1311232 A | 3/1973 |
| GB | 2006950 A | 5/1979 |
| JP | 60188795 A | 9/1985 |
| JP | 61164622 A | 7/1986 |
| JP | 62023418 A | 1/1987 |
| JP | 01041792 A | 2/1989 |
| JP | 6111591 A | 4/1994 |
| JP | 07243666 A | 9/1995 |
| JP | 08135999 A | 5/1996 |
| JP | 09239230 A | 9/1997 |
| WO | WO-9112476 A1 | 8/1991 |
| WO | WO-9641111 A1 | 12/1996 |
| WO | WO-02-50623 A1 | 6/2002 |
| WO | WO-2008057647 A2 | 5/2008 |

OTHER PUBLICATIONS

"Air Conditioner/Dehumidifier," abstract from Spinoff 1986 article, facsimile dated Nov. 29, 1999, 2 pages.

"DrizAir 2400 Dehumidifier: Introduced in Aug. 1998 . . . ", from web site, <http://www.dri-eaz.com/2400.htm>, Jan. 10, 2000, 2 pages.

Dri-Eaz, "2002 Product Catalog," Jan. 1, 2002, 7 pages.

Dri-Eaz, "Driz-Air 2400 Captures Design Award," <http://www.dri-eaz.com/newsreleases/newsrelease999.html>, internet accessed on Jan. 10, 2000, 2 pages.

Dri-Eaz, Product Catalog, Jan. 1, 2003, Burlington, Washington, U.S., 3 pages.

Hodnell, Charles, "Wrap-Around Heat Pipe Makes Its Debut!" Hot Line Newsletter, vol. 15, No. 1, Mar. 1995, 2 pages.

International Search Report and Written Opinion, International Application No. PCT/US09/64737, Mail Date Dec. 30, 2009, 15 pages.

Johannesen, R., et al., "Efficient Humidity Control with Heat Pipes," University of Florida—Florida Cooperative Extension Service, Fact Sheet, Dec. 1991, 7 pages.

Jon-Don; Gale Force Air Mover from Dry-Air at Jon-Don; www.jondon.com/galeforce/; Mar. 2003, 3 pages.

New Release, "Dri-EAZ Products Introduces Rotomolded Dehumidifier", Aug. 27, 1998, from web site, <http://www.dri-eaz/newsreleases898.html>, 3 pages.

Tropic Kool, "What are Heat Pipes?" <http://tropickool.com/heat-pipes.html>, internet accessed on Nov. 29, 1999, 6 pages.

International Search Report and Written Opinion, International Application No. PCT/US2010/032439, Applicant: Dri-Eaz Products, Inc., Mail Date Sep. 10, 2010, 14 pages.

Drieaz, "Complete Drying Solutions for Restorative Drying Professionals," 2000, 3 pages.

U.S. Appl. No. 29/435,041, filed Oct. 18, 2012, Wolfe.

Dri-Eaz, "DrizAir 120 Dehumidifier-Model Comparisons," 2000, 4 pages.

Dri-Eaz, Owner's Manuel—Evolution™ LGR Dehumidfier, 115v Model, Dri Eaz Products, Inc., www.dri-eaz.com, 2007, 7 pages.

Phoenix Restoration Equipment, "Phoenix 200 HT—High Temperature Performance," www.us.phoenix.com undated, 2 pages.

U.S. Products, "The Flood King—Portable Water Extractor for Restoration," Instant 212° F. Heat at the Wand Tip, http://www.usproducts.com/products/restoration/floodking.htm, accessed Aug. 17, 2011, 1 page.

* cited by examiner

SYSTEMS AND METHODS FOR OPERATING AND MONITORING DEHUMIDIFIERS

CROSS-REFERENCE TO RELATED APPLICATION

The present application claims priority to U.S. Provisional Application No. 61/173,128, filed Apr. 27, 2009, which is incorporated herein in its entirety by reference.

TECHNICAL FIELD

The following disclosure relates generally to systems and methods for dehumidifying air including dehumidifiers with variable speed air movers that are controlled in response to the humidity of the ambient air surrounding the dehumidifiers. The following disclosure also relates to systems and methods for remotely monitoring dehumidifiers.

BACKGROUND

Dehumidifiers are used for removing moisture from air. A conventional dehumidifier typically directs an air flow across several components of a refrigeration cycle. The components of the refrigeration cycle cool the air flow below the dew-point temperature so that water vapor in the air flow is condensed to liquid and removed. Dehumidifiers are useful in many different applications. For example, dehumidifiers are frequently used in residential applications to reduce the level of humidity in the air for health reasons, as humid air can cause unwanted mold or mildew to grow inside homes. Moreover, many homeowners operate dehumidifiers to decrease the humidity of the air in their homes for comfort reasons, as extremely humid air can be uncomfortable. Dehumidifiers are also frequently used in commercial or industrial applications, for example to dry the air in water damage restoration projects. The drier air helps contractors restore buildings or other structures that have been flooded or suffered other types of water damage.

DETAILED DESCRIPTION

Several embodiments of the disclosure are described below with reference to a dehumidifier that is configured to remove moisture from an air flow passing through the dehumidifier. Specific details are identified in the following description with reference to FIGS. 1-9B to provide a thorough understanding of various embodiments of the disclosure. Other details describing well-known structures or processes often associated with dehumidifiers, however, are not described below to avoid unnecessarily obscuring the description of the various embodiments of the disclosure. Moreover, although the following disclosure sets forth several embodiments of different aspects of the invention, other embodiments can have different configurations and/or different components than those described in this section. In addition, further embodiments of the disclosure may be practiced without several of the details described below, while still other embodiments of the disclosure may be practiced with additional details and/or features.

Figure 1:
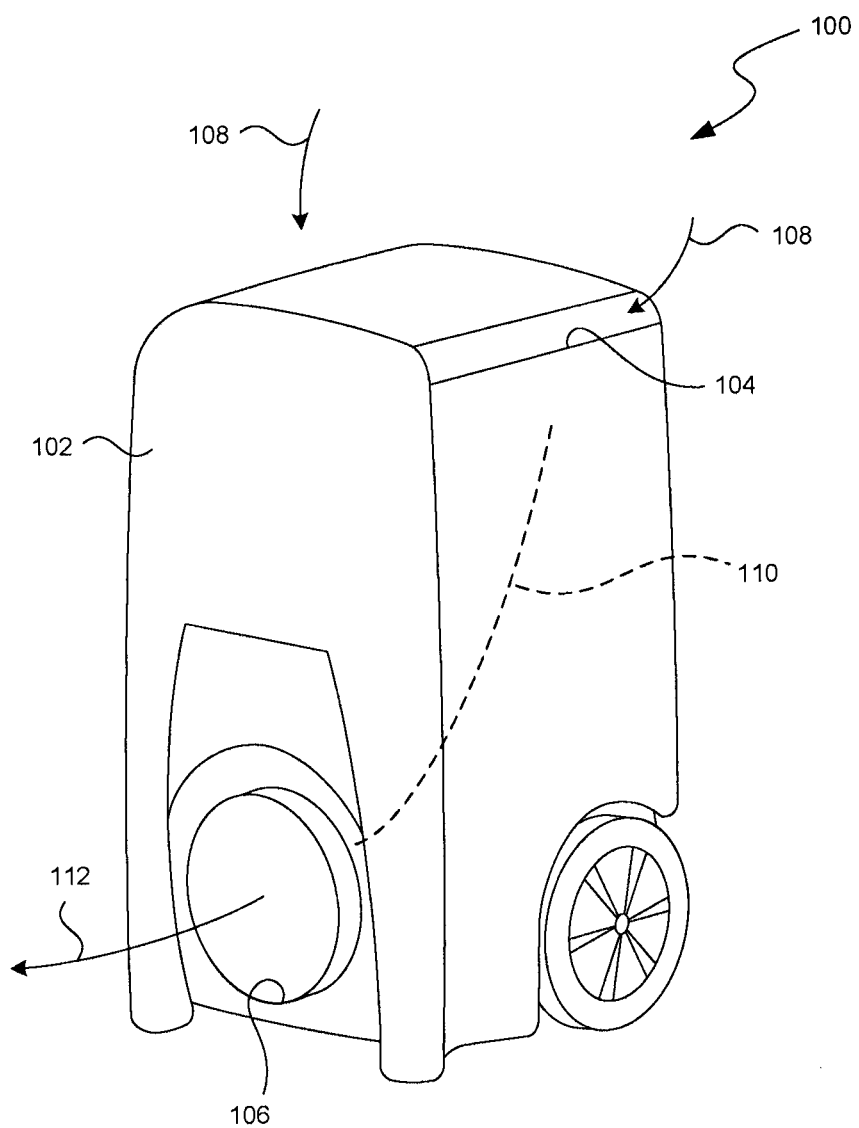
FIG. 1 is an isometric view of a dehumidifier configured in accordance with embodiments of the disclosure.

The present disclosure is directed generally to dehumidifiers and methods of controlling dehumidifiers. FIG. 1, for example, is an isometric view of a dehumidifier 100 that is used to describe several embodiments and features of the disclosure. As shown in FIG. 1, the dehumidifier 100 includes a cabinet or housing 102 with an inlet portion 104 and an outlet portion 106. As described in detail below with reference to FIG. 2, the dehumidifier 100 can include a refrigeration cycle including a moisture removal device (e.g., an evaporator) and an air mover (e.g., an impeller, fan, etc.) that directs air flow through at least the moisture removal device to remove moisture from the air flow. As shown in FIG. 1, for example, inlet air flow represented by first arrows 108 enters the inlet portion 104 of the dehumidifier 100. Intermediate air flow represented by a second arrow 110 (shown in broken lines) inside the housing 102 passes through, adjacent to, or otherwise in thermal communication with at least the moisture removal device of the dehumidifier 100 and exits the housing 102. Outlet air flow exits the housing 102 from the outlet portion 106 as indicated by a third arrow 112. Although the intermediate air flow 110 is shown as passing directly through the dehumidifier 100 from the inlet portion 104 to the outlet portion 106, one of ordinary skill in the relevant art will appreciate that air flow inside the dehumidifier 100 can include various different paths, for example, curved, looped, straight, separated, and/or divergent paths passing over, through, adjacent to, or otherwise in thermal communication with the various moisture removal components and/or refrigeration cycle components of the dehumidifier 100. As will also be appreciated by one of ordinary skill in the relevant art, the dehumidifier 100 illustrated in FIG. 1 can include any type of dehumidifier, including, for example, a portable, commercial, industrial, residential, and/or personal dehumidifier.

According to one aspect of the illustrated embodiment, the air mover of the dehumidifier 100 is a variable speed air mover that is automatically controlled in response to the humidity of the ambient air surrounding the dehumidifier 100. In certain embodiments, for example, a controller automatically decreases the operational speed of the air mover to a non-zero speed as the ambient humidity decreases for the purpose of reducing the volumetric air flow rate of air flow through the dehumidifier. Further details of this operation are described below with reference to FIGS. 2-4.

Figure 2:
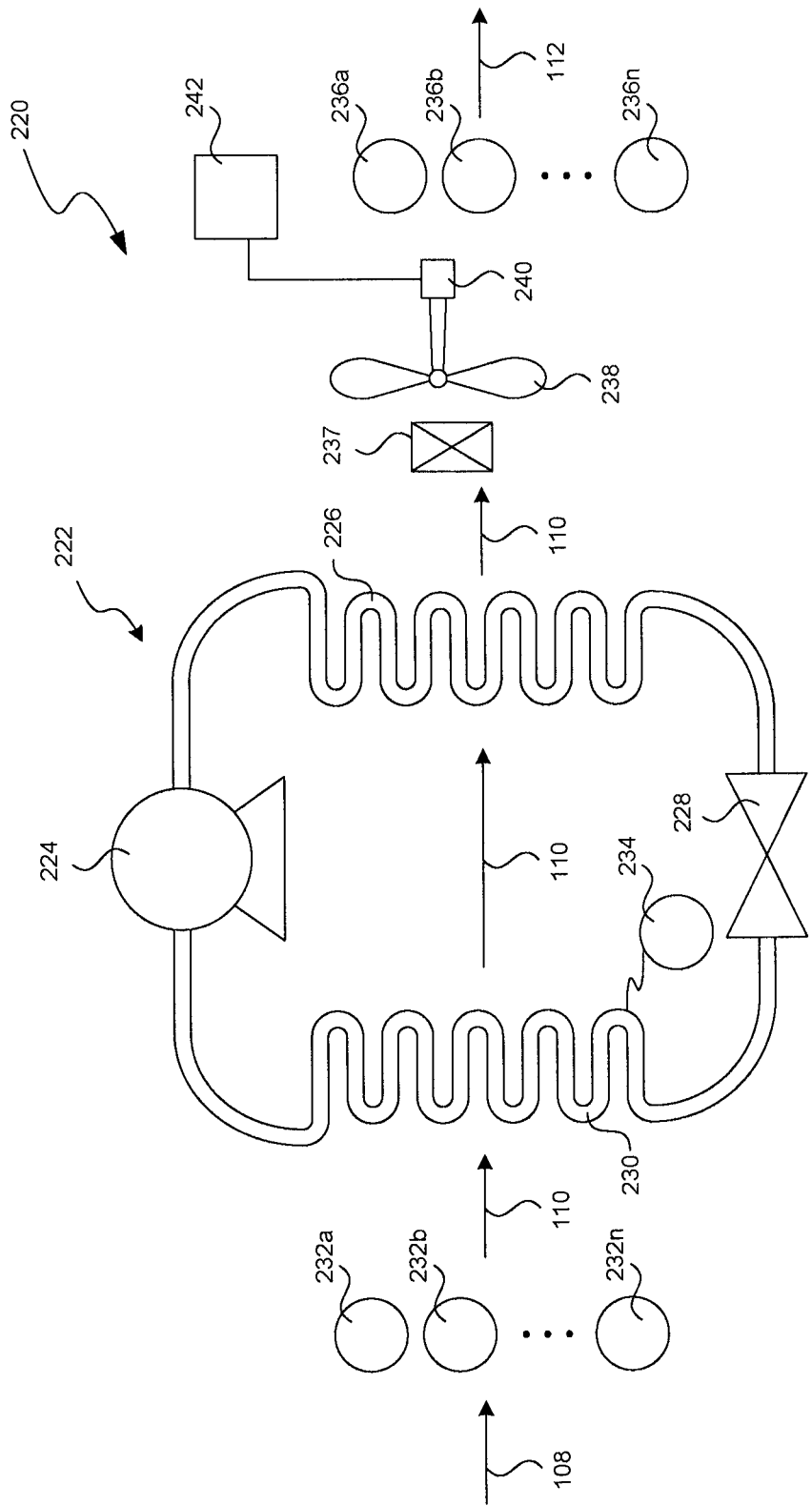
FIG. 2 is a schematic diagram of several components of a dehumidifier configured in accordance with embodiments of the disclosure.

FIG. 2 is a schematic diagram of a subassembly 220 configured in accordance with an embodiment of the disclosure illustrating several components of the dehumidifier 100 of FIG. 1. As shown in FIG. 2, the subassembly 220 includes a refrigeration cycle 222 in which a compressor 224 delivers a hot compressed gas refrigerant to a condenser 226. The condenser 226 condenses the hot gas refrigerant to a hot liquid refrigerant and delivers the hot liquid refrigerant to an expansion device 228. The expansion device 228 expands the hot liquid refrigerant to reduce the temperature and pressure of the liquid. The expansion device 228 delivers the cooled liquid refrigerant to a moisture removal device or evaporator 230, and the evaporator 230 evaporates the cooled gas refrigerant. The evaporator 230 returns the cooled gas refrigerant to the compressor 224 to complete the refrigeration cycle.

According to one feature of the illustrated embodiment, the subassembly 220 includes multiple sensors that are configured to measure various properties of the ambient air and/or components of the subassembly 220. More specifically, the subassembly 220 includes one or more inlet sensors 232 (identified individually as a first inlet sensor 232a, a second inlet sensor 232b ... and an nth inlet sensor 232n) positioned upstream from the evaporator 230 and/or proximate to the inlet portion 104 of the dehumidifier 100 (FIG. 1). The inlet sensors 232 are configured to measure or detect properties of the ambient air flow entering the dehumidifier 100 before the evaporator 230 dehumidifies the air flow. In certain embodiments, for example, the inlet sensors 232 include temperature sensors (e.g., thermocouples and/or thermometers) capable of measuring at least wet-bulb, dry-bulb, and/or dew-point temperatures of the ambient air. The inlet sensors 232 can also include humidity sensors (e.g., hygrometers and/or psychrometers) capable of measuring relative and specific humidities of the ambient air.

The subassembly 220 can also include an evaporator sensor 234 that measures a temperature of the evaporator 230. The temperature of the evaporator 230 is useful because it varies approximately linearly with other properties of the ambient air surrounding the dehumidifier 100. For example, the humidity of the ambient air can be determined at least in part from the temperature of the evaporator 230. The subassembly 220 can further include outlet sensors 236 (identified individually as a first outlet sensor 236a, a second outlet sensor 236b ... and an nth outlet sensor 236n). The outlet sensors 236 measure various properties of the dehumidified air flow that exits the dehumidifier 100, including, for example, the specific humidity and temperature. In certain embodiments, the properties of the dehumidified exit air flow can be used to determine the dehumidifier performance.

In particular embodiments, the inlet sensors 232 and the outlet sensors 236 can be carried by the dehumidifier 100 of FIG. 1 proximate to the inlet portion 104 and the outlet portion 106, respectively. In other embodiments, however, any of the various sensors can be positioned exterior to and/or separate from the dehumidifier 100 in the environment where the dehumidifier 100 is in use. For example, these sensors can include separate portable components that are movable relative to the dehumidifier 100. Moreover, any of the various sensors can communicate with other components via wireless communication and/or wired communication.

The subassembly 220 shown in FIG. 2 further includes an air mover 238 that directs air flow over some of the components of the refrigeration cycle 222 (e.g., the evaporator 230 and the condenser 226) to remove the moisture from the air flow. The air mover 238 can be any type of air mover suitable for use with dehumidifiers, including, for example, impellers, fans, propellers, and blowers. The air mover 238 can also include an air flow regulator or valve 237 that controls the volumetric flow rate of the air flow through the dehumidifier 100. Moreover, although FIG. 2 illustrates the air mover 238 at a position downstream from the evaporator 230 and the condenser 226, one skilled in the relevant art will appreciate that the air mover 238 can be positioned at any suitable location within the dehumidifier 100 to move the air flow through the dehumidifier 100. The air mover 238 is coupled to a motor 240 that drives (e.g., rotates) the air mover 238. A controller 242 (e.g., a computer-based processor) is operably coupled to the motor 240. The controller 242 is also operably coupled to the system sensors, e.g., the inlet sensors 232, the evaporator sensor 234, and/or the outlet sensors 236. As such, the controller 242 can receive input from the various sensors to determine when to adjust the volumetric air flow rate through the dehumidifier 100. For example, the controller 242 can sense a change in the operating condition of the dehumidifier 100 from the data received from the various sensors. As used herein, the operating condition of the dehumidifier 100 can include at least the properties of the ambient air surrounding the dehumidifier 100, the properties of the inlet air flow 108, the intermediate air flow 110, and the outlet air flow 112, the properties of one or more of the components of the dehumidifier 100, as well as the operational mode of the dehumidifier (e.g., defrost or non-defrost modes). The foregoing conditions can include physical quantities (e.g., temperature) and/or correlates of those quantities (e.g., sensor voltages). The controller 242 can respond to the operating conditions (or changes to the operating conditions) of the dehumidifier 100 and automatically control the motor 240 to adjust the speed of the air mover 238, which in turn changes the volumetric flow rate of the air flow through the dehumidifier 100. The subassembly 220 can further include a suitable type of memory or computer readable media including instructions thereon to perform the methods for operating dehumidifiers as described herein. The controller 242 can accordingly perform these instructions and other processes associated with the methods described herein.

In operation, the controller 242 controls the motor 240 to drive the air mover 238 and direct the inlet air flow 108 over the inlet sensors 232. The inlet sensors 232 detect the properties of the ambient air flow entering the dehumidifier 100 so that the controller 242 can determine the humidity of the ambient air surrounding the dehumidifier 100, and/or other operating conditions of the dehumidifier 100. The air mover 238 also directs the intermediate air flow 110 across the evaporator 230 to cool the air flow below the dew-point temperature of the air flow so water vapor in the air flow is condensed to liquid and removed from the air flow. The speed of the air mover 238 generally corresponds to a volumetric flow rate of the intermediate air flow 110 across the evaporator 230. The volumetric flow rate of the intermediate air flow 110 is inversely proportional to a residence or dwell time of the intermediate air flow 110 at the evaporator 230, during which time the evaporator 230 removes the moisture from the intermediate air flow 110. As the air flow passes across the evaporator 230, the evaporator sensor 234 can sense the temperature of the evaporator 230. The air mover 238 further directs the dehumidified intermediate air flow 110 across the condenser 226 to warm the air flow before the air flow exit the dehumidifier 100. The air mover 238 finally directs the outlet air flow 112 across the outlet sensors 236, and the outlet sensors 236 can detect the temperature and/or humidity of the dehumidified outlet air flow 112.

Figure 3:
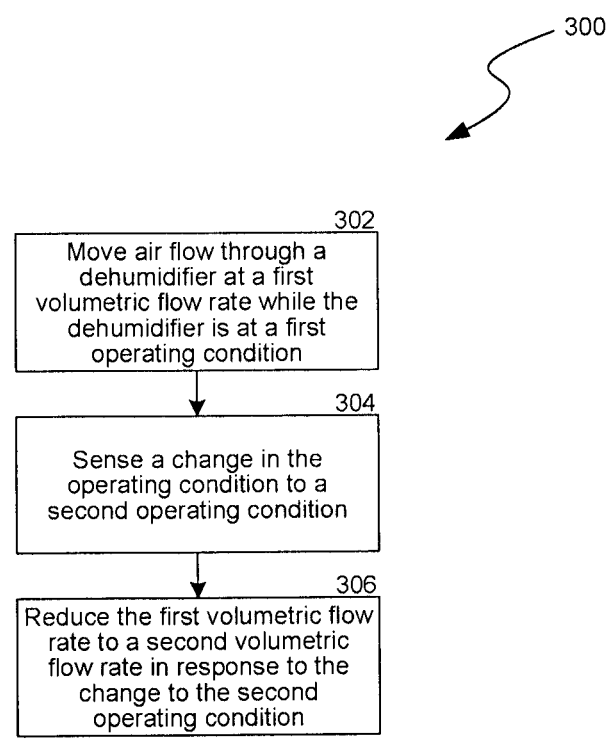
FIG. 3 is a flow diagram of a method of operating a dehumidifier in accordance with embodiments of the disclosure.

FIG. 3 is a flow diagram of a method 300 of operating a dehumidifier in accordance with embodiments of the disclosure. Although the method 300 illustrated in FIG. 3 is at least partially described with reference to the dehumidifier 100 and subassembly 220 of FIGS. 1 and 2, the method 300 can be used with other types of dehumidifiers as well. The method 300 includes moving air flow through a dehumidifier at a first volumetric flow rate while the dehumidifier is at a first operating condition (block 302). Referring to FIGS. 1 and 2 for example, moving the air flow at the first volumetric flow rate includes operating the motor 240 to drive the air mover 238 at a first speed and/or throttling or otherwise regulating the flow. As explained above, as the air flow passes through the dehumidifier 100 at the first volumetric flow rate, the air flow has a first residence or dwell time at the evaporator 230 within the dehumidifier 100. In certain embodiments, the first operating condition of the dehumidifier corresponds to a first humidity of the ambient air surrounding the dehumidifier 100. In other embodiments, however, and as described in detail below, the first operating condition can refer to other operating conditions including, for example, an operational mode in which the dehumidifier 100 is operating in a defrost mode.

Referring again to FIG. 3, the method 300 further includes sensing a change in the operating condition of the dehumidifier from the first operating condition to a second operating condition (block 304). In certain embodiments, the second operating condition corresponds to a second humidity of the ambient air surrounding the dehumidifier 100. More specifically, the second operating condition can be a predetermined second humidity threshold that is less than the first humidity of the ambient air. For example, as the dehumidifier 100 continues to remove moisture from the air flow passing through the dehumidifier 100, the humidity of the ambient air surrounding the dehumidifier 100 decreases. In other embodiments, however, and as described in detail below, the second operating condition can refer to an operational mode in which the dehumidifier is operating in a non-defrost or normal cycle.

In certain embodiments, sensing the change in the ambient humidity can be accomplished with measurements from the inlet sensors 232. For example, the inlet sensors 232 can measure the relevant properties of the ambient air and transmit this data to the controller 242, which in turn determines the change in the humidity of the ambient air. As will be appreciated by one of ordinary skill in the relevant art, the humidity of the ambient air can be determined from measuring the dry-bulb temperature and the relative humidity of the ambient air, as well as other properties including at least the wet-bulb temperature, the dew-point temperature, and/or the specific humidity. Moreover, in other embodiments the evaporator sensor 234 can monitor the temperature of the evaporator 230 to provide input regarding the humidity of the ambient air, as the temperature of the evaporator 230 is a nearly linear function of the ambient conditions. Accordingly, the controller 242 can also determine the changes in the ambient humidity based on input from the evaporator sensor 234. In still further embodiments, other parameters of the dehumidifier and/or their correlates can be used to determine the point at which to reduce the air flow through the dehumidifier. For example, the controller 242 can operate the air mover 238 in response to a voltage received from a sensor, and without calculating the ambient humidity. Moreover, the controller 242 can include a deadband or neutral zone of the input signal range where the air mover 238 is not activated. The deadband can accordingly prevent the controller 242 from oscillating or repeatedly activating and deactivating the air mover 238 between the high and low volumetric flow rates around the target operating conditions.

The method 300 illustrated in FIG. 3 further includes automatically reducing the volumetric flow rate through the dehumidifier to a second volumetric air flow rate in response to detecting or otherwise receiving an indication of the change to the second operating condition (block 306). Reducing the volumetric flow rate to the second volumetric flow rate can include reducing the first speed of the air mover 238 (FIG. 2) to a second non-zero speed that is less than the first speed. More specifically, the controller 242 can control the motor 240 to reduce the speed of the air mover 238 in response to the change to the second operating condition. In other embodiments, reducing the volumetric air flow can include otherwise restricting the flow of the air flow through the dehumidifier 100. For example, the air flow can be directed through a flow restrictor or valve to adjust the air flow through the dehumidifier 100.

As the controller 242 decreases the volumetric flow rate, the residence or dwell time of the air flow at the evaporator 230 increases. This allows the dehumidifier 100 to be responsive to the ambient conditions and continue to remove useful amounts of moisture from the air flow even as the humidity of the ambient air surrounding the dehumidifier 100 decreases. During testing, for example, reducing the volumetric flow rate of low humidity air through the dehumidifier yielded the counterintuitive and unexpected result of removing dramatically more moisture from the air flow than was removed by a similar dehumidifier operating at a higher volumetric air flow rate at the same relatively low ambient humidity. This result was surprising because it would seem that moving less air through the dehumidifier for a given amount of time would remove less moisture from the air flow. The inventors found, however, that when the ambient humidity is at a relatively low level, increasing the residence or dwell time of the air flow at the evaporator removes more moisture from the air flow than operating the dehumidifier at a higher volumetric flow rate with the decreased dwell time. More specifically, the inventors tested first and second dehumidifiers under identical conditions while drying the air in the interior of a building. Near the end of the drying process, the humidity of the ambient air was in the low to mid 30's grains of water per pound of dry air. At this relatively low ambient humidity, the inventors reduced the volumetric flow rate of only the first dehumidifier. The inventors discovered that the first dehumidifier, with the decreased air flow rate, removed dramatically more moisture from the relatively dry air than the second dehumidifier. More specifically, the first dehumidifier removed approximately double the amount of moisture from the air compared to that of the second dehumidifier at the relatively low ambient humidity and over the same period of time.

Referring again to FIG. 3, the predetermined second operating condition of block 304, which is the switching point to the reduced volumetric air flow rate, depends on several factors including at least the design and capacity of the dehumidifier. In one embodiment, however, the predetermined second operating condition can be a humidity ratio of the ambient air in the range of approximately 30-45 grains of water per pound of dry air, or at approximately 35 grains of water per pound of dry air. Moreover, reducing the first volumetric flow rate to the second volumetric flow rate can include reducing the first volumetric flow rate by approximately 25-50%, or approximately 33%. In other embodiments, however, the corresponding humidity ratio and volumetric flow rate can differ from the values listed above. In a one example, the first volumetric air flow rate can be approximately 300 cubic feet per minute (cfm), and the predetermined second operating condition can be approximately 85 degrees Fahrenheit and 30% relative humidity. At these conditions, the first volumetric flow rate can be reduced to a second volumetric flow rate of approximately 200 cfm. In still further embodiments, the controller can vary the air flow in finer increments, e.g., more than just two different volumetric air flow rates. In yet another example, the volumetric flow rate can be reduced in response to the operating condition of the dehumidifier changing by a threshold value or beyond a threshold value. In one embodiment, for example, the volumetric flow rate can be reduced when the humidity of the ambient air decreases by a percentage of approximately 50-75%. In another embodiment, the volumetric flow rate can be reduced when the humidity of the ambient air decreases beyond a threshold relative humidity value, such as decreasing beyond approximately 33% relative humidity, for example.

Figure 4:
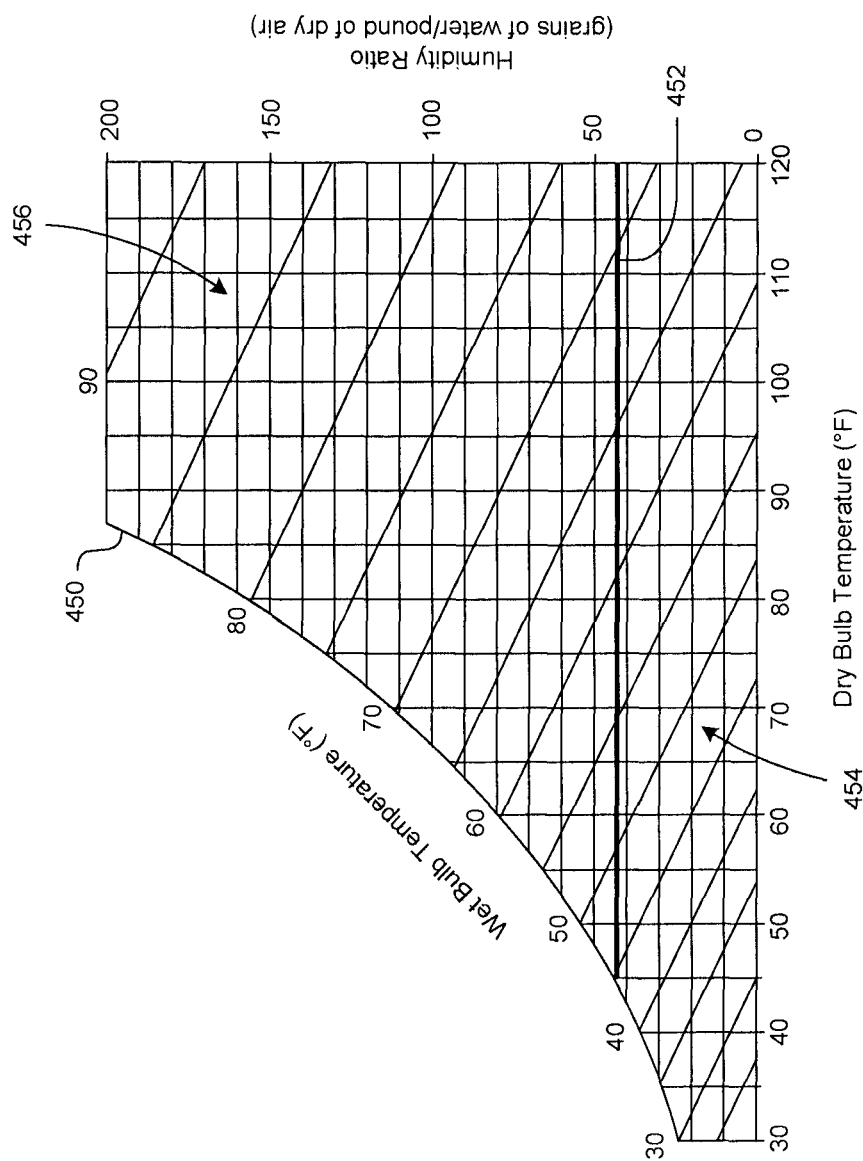
FIG. 4 is a schematic diagram of a psychrometric chart illustrating several operating conditions of a dehumidifier operating in accordance with an embodiment of the disclosure.

FIG. 4 is a schematic diagram of a psychrometric chart 450 illustrating several operating conditions of a dehumidifier operating in accordance with the disclosure. As shown in FIG. 4, a humidity line 452 indicates a relative humidity of approximately 42 grains of water per pound of dry air (also commonly expressed as 0.006 pounds of water per pound of dry air). A first region 454 of the psychrometric chart 450 below the humidity line 452 accordingly has a relatively low ambient humidity, and a second region 456 above the humidity line 452 has a relatively high ambient humidity. Therefore, in accordance with an embodiment of the disclosure, a dehumidifier can operate at a high volumetric flow rate in an environment when the properties of the ambient air are in the second region 456 (e.g., at a relatively high ambient humidity), and the air flow can be reduced to a lower volumetric air flow rate when the properties of the ambient air are in the first region 454 (e.g., at a relatively low ambient humidity). As will be appreciated by one of ordinary skill in the relevant art, the humidity line 452 or switching point between the high and low volumetric air flow rates can be at greater or less than 42 grains of water per pound of dry air in other embodiments.

According to another embodiment of the disclosure, the volumetric flow rate or air mover speed can be changed depending on the operational mode of the dehumidifier. More specifically, referring again to FIG. 3, the first operating condition at block 302 can be a defrost mode of the dehumidifier, and the predetermined second operating condition at block 304 can be a non-defrost or normal mode of the dehumidifier. The defrost mode is generally used to remove built-up ice from the evaporator. For example, in relatively cool and dry ambient conditions, a very cold evaporator can form a substantial amount of ice during operation. Therefore, the dehumidifier needs to be periodically operated in a defrost mode to remove the ice from the evaporator so that the dehumidifier can effectively continue to remove moisture from the air. In one embodiment of the defrost mode, refrigerant does not flow through the refrigeration cycle of the dehumidifier, while the air mover continues to direct the ambient air flow at the higher first volumetric flow rate through the dehumidifier and across the evaporator to melt the built-up ice. When the ice has melted, the dehumidifier can continue in the non-defrost or normal mode with the reduced second volumetric flow rate through the dehumidifier.

Figure 5A:
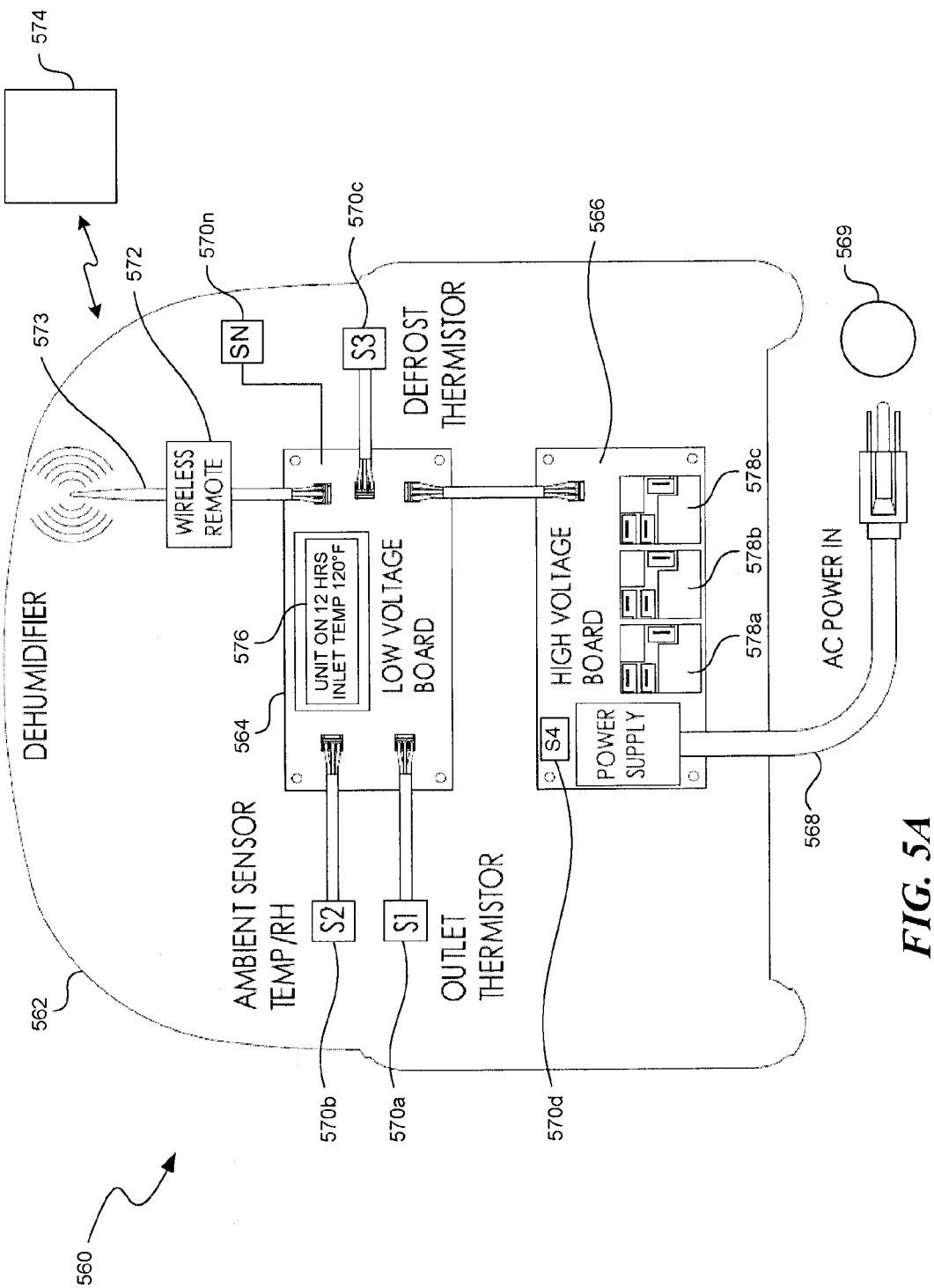
FIGS. 5A and 5B are schematic diagrams of a system configured in accordance with another embodiment of the disclosure.
Figure 5B:
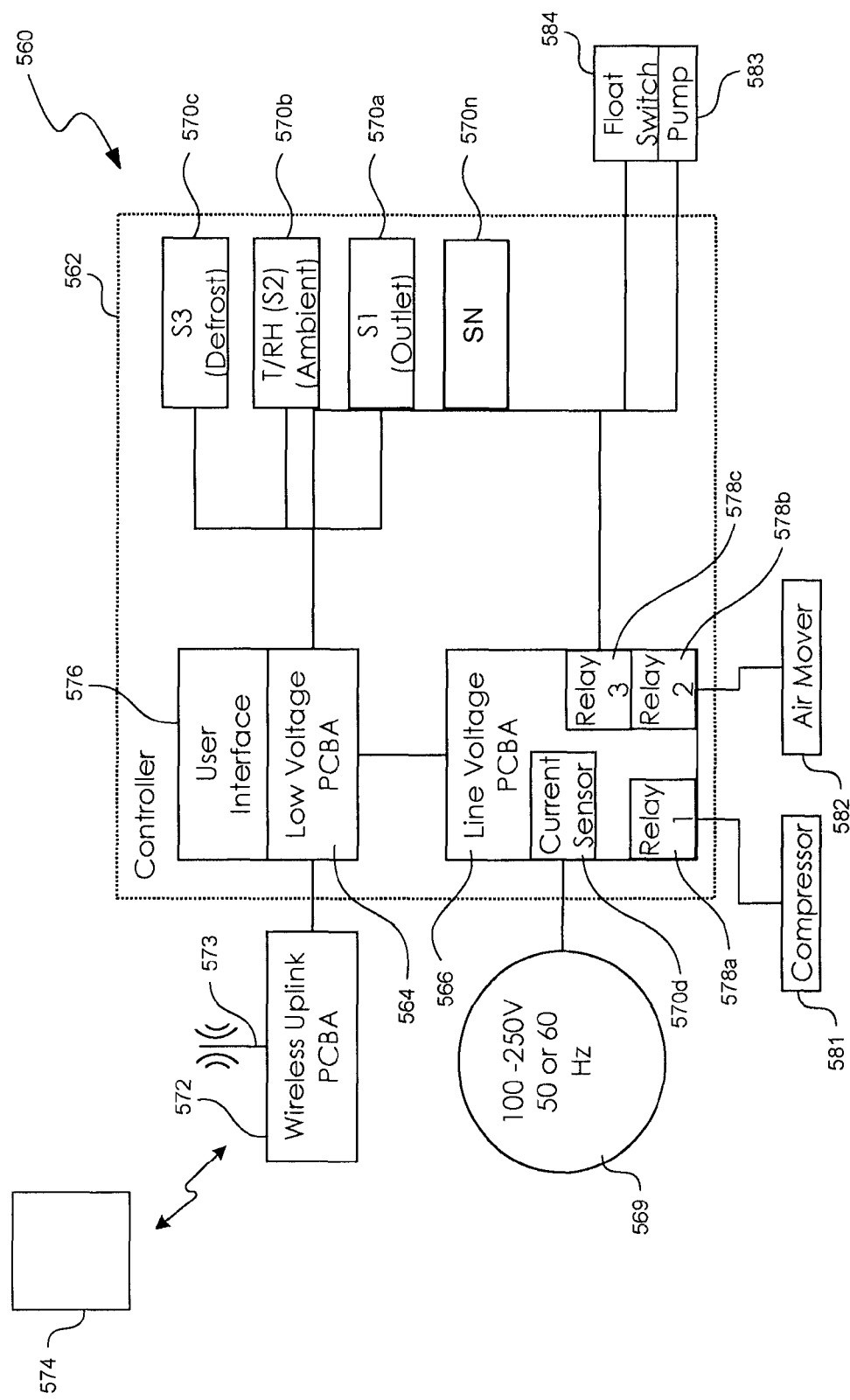

According to yet another embodiment of the disclosure, and as described below with reference to FIGS. 5A-9B, a dehumidifier is configured to transmit data relating to the operating conditions and/or any other properties of the dehumidifier to a remote location. For example, FIGS. 5A and 5B are schematic diagrams of a system 560 including a first communication module 574 separate or remote from a dehumidifier 562. The dehumidifier 562 can include several features that are generally similar in structure and function to the corresponding features of the dehumidifier 100 described above with reference to FIGS. 1-4. For example, the dehumidifier 562 can include a refrigeration cycle, and an air flow path through the dehumidifier 562. The dehumidifier 562 can also include a controller (e.g., a computer-based processor) that is operably coupled to any of the components of the dehumidifier 562. The dehumidifier 562 can further include a suitable type of memory or computer readable media including instructions thereon to perform the methods for operating dehumidifiers as described herein.

Referring to FIGS. 5A and 5B together, the dehumidifier 562 transmits data relating to the dehumidifier 562 and/or operating conditions of the dehumidifier 562 to the first communication module 574 to allow an operator to monitor the data relating to the dehumidifier 562 and/or associated operating conditions. In some embodiments, the operator can also control the dehumidifier 562 from the first communication module 574. In the illustrated embodiment, the dehumidifier 562 includes a first low voltage circuit board or module 564 that is coupled to a second high voltage circuit board or module 566. The second module 566 is coupled to a power source 569 (e.g., an AC power supply) via a power line 568. The second module 566 is further coupled to a compressor 581, an air mover 582, and a pump 583 (FIG. 5B) via corresponding relays 578 (identified individually as a first relay 578a, a second relay 578b, and a third relay 578c).

The first module 564 is coupled to multiple sensors 570 (identified individually as a first through nth sensors 570a-570n). The sensors 570 are configured to detect various properties of the dehumidifier 562 and/or operating conditions of the dehumidifier 562. For example, in certain embodiments, the first sensor 570a can be an outlet sensor and the second sensor 570b can be an inlet sensor that sense the properties associated with the outlet air flow and ambient inlet air flow, respectively (e.g., an ambient temperature sensor and/or ambient relative humidity sensor). Moreover, the third sensor 570c can be a defrost sensor that monitors a defrost cycle of the dehumidifier 562, and the fourth sensor 570d can be a current sensor that monitors the current and/or power into the dehumidifier 562. The nth sensor 570n can be any other sensor suitable for detecting properties and operating conditions associated with the dehumidifier 562. As shown in FIG. 5B, the first module 564 is also coupled to a float switch 584 (FIG. 5B) that is configured to detect the conditions (e.g., fluid level) of the pump 583.

In certain embodiments, the first sensor 570a and the third sensor 570c can be thermistors with a settable range between approximately −17.7° C. and 19.4° C., an accuracy of approximately +/−0.51° C. at 25° C., an initiation temperature range between approximately −17.7° C. and 8.8° C., a termination temperature range between approximately −1.6° C. and 19.4° C., and a cable length range between approximately 635 and 1778 mm. Moreover, in certain embodiments the second sensor 570b can be a Sensiron SHT11 or SHT15 sensor with a temperature range between approximately −17.7-51.7° C., a temperature accuracy of approximately +/−0.51° C. at 25° C., a relative humidity range between approximately 0-100%, and a relative humidity accuracy of approximately +/−2% at 10-90% relative humidity or +/−3% at 20-80% relative humidity. In addition, the fourth sensor 570d can be an Allegro ACS712 current sensor.

The first module 564 is further coupled to a user interface module 565 and a second communication module 572 so that the dehumidifier 562 can display information regarding the dehumidifier 562 and/or operating conditions. More specifically, any of the data obtained by the sensors 570 can be displayed at the dehumidifier 562 on the user interface module 576. Moreover, a second communication module 572 can also transmit any of the data obtained by the sensors 570 to the first communication module 574, which is at a location remote from the dehumidifier 562. For example, the second communication module 572 can wirelessly transmit the data via an antenna 573. In certain embodiments, the second communication module 572 can transmit the data via any suitable communications protocol including, for example, Bluetooth, WiFi 802.11, cellular, ZigBee, Infrared Data Association (IrDA), Global System for Mobile Communication (GSM), Long Term Evolution (LTE), short and long range radio, ultra wide band radio, microwave, radar, and/or the like. In addition, the second communication module 572 can transmit the data via any suitable network such as the Internet, intranet, phone network, or other network. For example, the second communications module 572 can transmit the data via the Internet such that an operator can view the data at a website or web page (e.g., via a computer, mobile computing device, and/or cell phone). In still further embodiments, the second communications module 572 can transmit the data via a wired connection including, for example, an Ethernet connection, direct connect, pulse width modulation (PWM), and the like. Moreover, the first communication module 574 can include any type of transceiver and/or receiver suitable for receiving the data from the first communication module. For example, the first communication module 574 can include a computer, radio, cell phone, and/or mobile computing device. In certain embodiments, the first communication module 574 can also send data to the second communication module 572. For example, an operator who is not located in the vicinity of the dehumidifier 562 can send an instruction and/or command to the dehumidifier 562 (e.g., to deactivate the dehumidifier after remotely reviewing the operating conditions).

The system 560 of FIGS. 5A and 5B accordingly allows a user to remotely monitor and/or remotely control the status and operation of the dehumidifier 562 (e.g., reduce the volumetric air flow through the dehumidifier). The information that can be transmitted to a remote operator can include any of the operating conditions associated with the dehumidifier 562. For example, the transmitted data can include at least the properties of the air flow through the dehumidifier 562 (e.g., temperature and relative humidity). More specifically, the transmitted data can include at least the temperature and relative humidity of the ambient air surrounding the dehumidifier 562, the inlet air flow, the intermediate air flow through the dehumidifier 562, and the outlet air flow. The transmitted data can also include properties and/or operating conditions of one or more of the components of the dehumidifier 562 (e.g., the compressor 581, the air mover 582, the pump 583, an evaporator, the user interface 576, the power source 569, and/or any of the refrigeration cycle components), as well as the operational mode and status of the dehumidifier 562, and/or any errors associated with the dehumidifier 576. The foregoing conditions can include physical quantities (e.g., temperature) and/or correlates of those quantities (e.g., sensor voltages). More specifically, the transmitted data can include at least information relating to a mode or status of the dehumidifier (e.g., that the compressor is on delay with a countdown to zero, that the dehumidifier is deactivated or activated, in a defrost mode, in a pump purging mode, and/or the total time that the dehumidifier has been activated or deactivated); as well as any errors associated with the system (e.g., processor or memory failure, input or keypad failure such as a damaged key, sensor failure such as a damaged or loose sensor, defrost modes that are too long, pump failure in which the dehumidifier may automatically deactivate when the pump has run too long or triggered by a float safety switch, and/or current drawn in the overcurrent state). Moreover, the information can be displayed at the first communication module 574 and the user interface module 576 in one or more languages including, for example, English, Spanish, German, and/or French.

Figure 6:
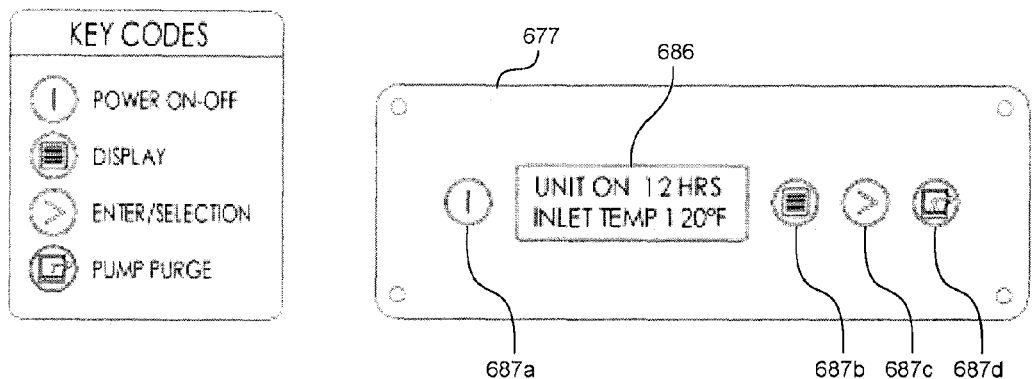
FIG. 6 is a schematic diagram of a user interface configured in accordance with an embodiment of the disclosure.

FIG. 6 is a schematic diagram of a user interface 677 configured in accordance with an embodiment of the disclosure. The user interface 677 includes a display 686 that displays or outputs messages relating to the operating conditions and status of the dehumidifier, including any of the data listed above. The user interface 677 also includes a plurality of buttons 687 (identified individually as first-fourth buttons 687a-687d) that allow an operator to navigate through the displayed information and/or control different functions of the dehumidifier (e.g., activate and deactivate the dehumidifier, and purge the pump). In other embodiments, the user interface module 576 can include a greater or lesser number of buttons 687 to navigate and/or control the dehumidifier, as well as perform other functions. Moreover, in certain embodiments, the first communication module 574 (FIGS. 5A and 5B) can include a user interface that is generally similar to that shown in FIG. 6. In other embodiments, however, the first communication module 574 can include any user interface that is suitable for monitoring the dehumidifier (e.g., a web page, mobile computing device, and/or computer).

Figure 7:
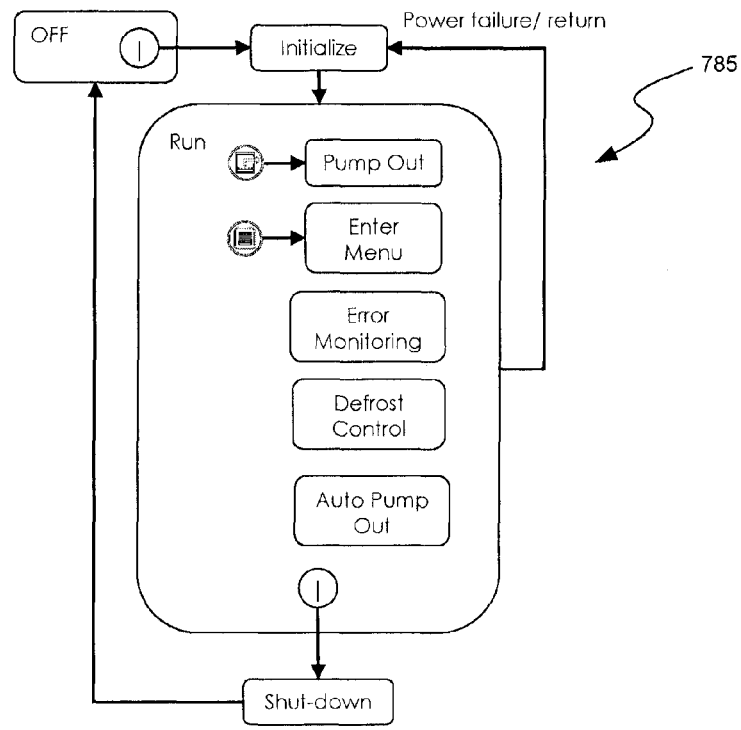
FIGS. 7 and 8 are schematic diagrams illustrating navigation menus configured in accordance with embodiments of the disclosure.
Figure 8:
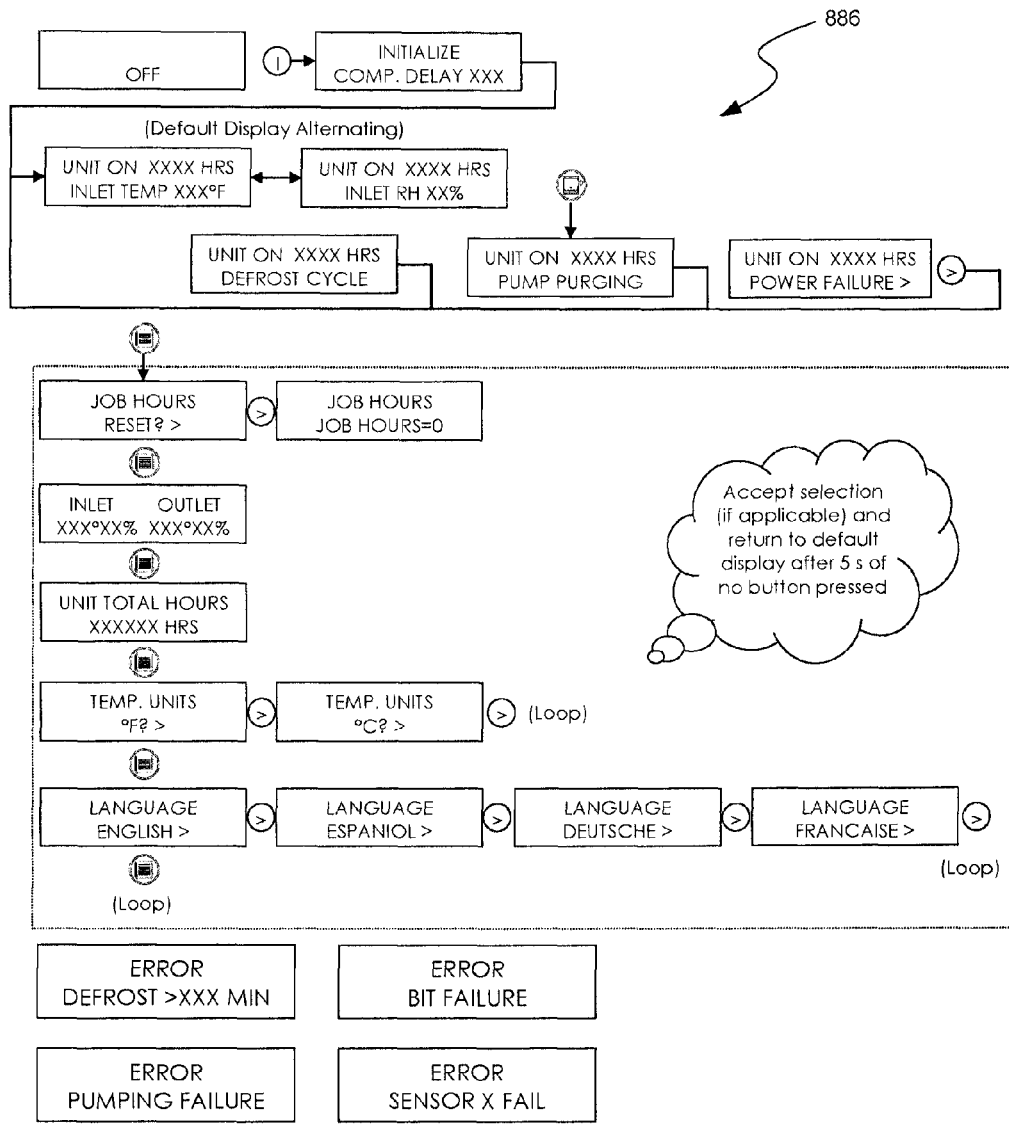

FIGS. 7 and 8 are schematic diagrams illustrating navigation menus configured in accordance with embodiments of the disclosure. The navigation menus illustrated in FIGS. 7 and 8 can be implemented at the dehumidifier 562 and/or remotely from the dehumidifier 562 at the first communication module 574. More specifically, FIG. 7 is a first navigation menu 785 illustrating several of the high-level or general options that an operator can view when navigating through the data presented by the user interface module 576 of FIG. 6. FIG. 8 is a second navigation menu 886 illustrating several detailed options corresponding to the operating conditions, errors, and/or related dehumidifier properties that a user can view in response to navigating through the user interface module 576 of FIG. 6.

Figure 9A:
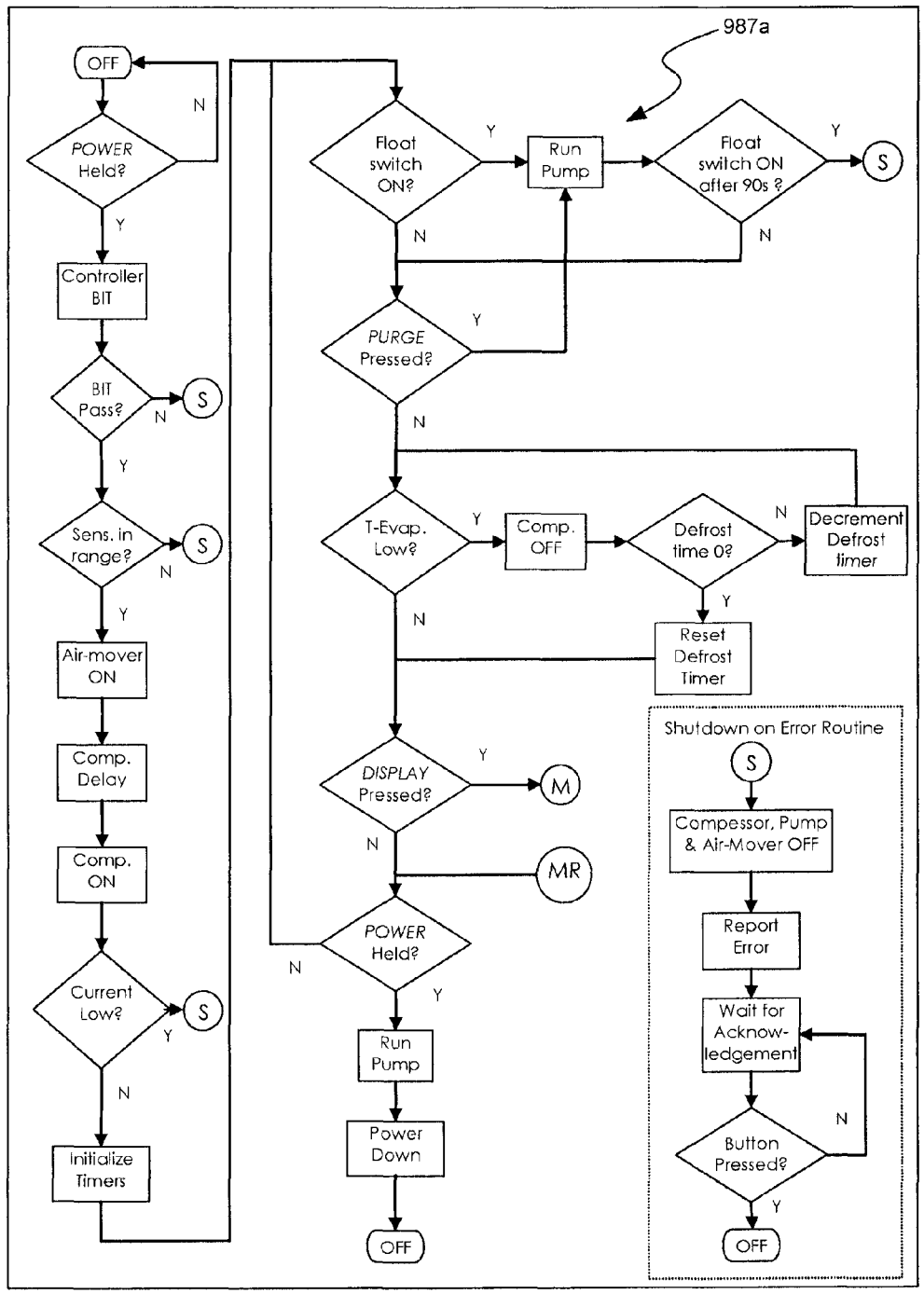
FIGS. 9A and 9B are flow diagrams of methods of navigating a user interface configured in accordance with an embodiment of the disclosure.
Figure 9B:
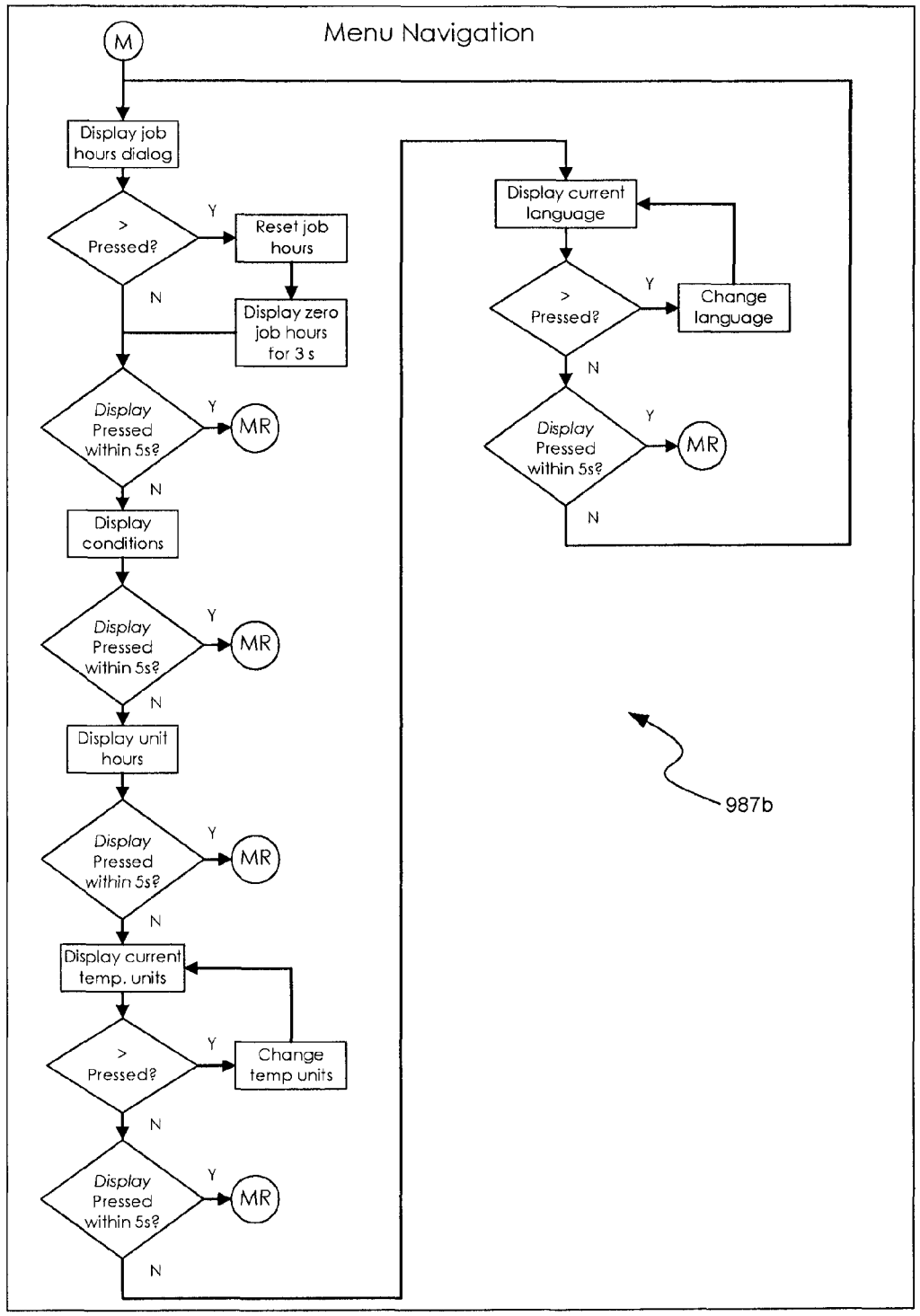

FIGS. 9A and 9B are flow diagrams of methods of navigating through the data presented to an operator in accordance with an embodiment of the disclosure. More specifically, FIG. 9A is a first flow diagram 987a and FIG. 9B is a second flow diagram 987b of a method of navigating through a menu structure configured in accordance with an embodiment of the disclosure. The second flow diagram 987b of FIG. 9B is a continuation of the first flow diagram 987a of FIG. 9A. An operator can navigate through the illustrated first and second flow diagrams 987a and 987b both remotely from the first communication module 574 and at the dehumidifier 562.

From the foregoing, it will be appreciated that specific embodiments have been described herein for purposes of illustration, but that various modifications may be made without deviating from the spirit and scope of the disclosure. For example, a dehumidifier as described herein can be configured to operate at three or more volumetric flow rates according to three or more corresponding ambient conditions. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the disclosure.

We claim:

1. A method of controlling air flow through a dehumidifier having an air mover and a moisture removal device, the method comprising:

operating the air mover at a first speed to direct air flow into thermal contact with the moisture removal device while ambient air surrounding the dehumidifier is at a first ambient condition that includes a first humidity, wherein air flow through the dehumidifier has a first dwell time at the moisture removal device with the air mover operating at the first speed;

sensing a change from the first ambient condition to a second ambient condition that includes a second humidity less than the first humidity and below a threshold humidity value; and in response to the change, automatically operating the air mover at a second non-zero speed that is slower than the first speed to increase the first dwell time of air flow at the moisture removal device to a second dwell time.

2. The method of claim 1 wherein sensing the change includes measuring one or more of a dry-bulb temperature, a wet-bulb temperature, a dew-point temperature, a relative humidity, and a specific humidity of the ambient air.

3. The method of claim 1 wherein sensing the change includes sensing a decrease in a temperature of the moisture removal device from a first temperature to a second temperature, and wherein the decrease in the temperature of the moisture removal device corresponds to a decrease in humidity of the ambient air surrounding the dehumidifier.

4. The method of claim 1 wherein operating the air mover at the first and second speeds to direct air flow includes directing air flow into thermal communication with an evaporator.

5. The method of claim 1 wherein the threshold humidity value is less than about 45 grains per pound (GPP).

6. A method of operating a dehumidifier, the method comprising:

moving air flow through the dehumidifier at a first volumetric flow rate while an operating condition of the dehumidifier includes a first humidity value; and automatically decreasing from the first volumetric flow rate to a second non-zero volumetric flow rate in response to the operating condition of the dehumidifier decreasing beyond a threshold humidity value from the first humidity value to a second humidity value less than the first humidity value.

7. The method of claim 6 wherein:

moving air flow through the dehumidifier at the first volumetric flow rate includes driving an air mover in the dehumidifier at a first speed; and changing the first volumetric flow rate includes driving the air mover at a second speed that is slower than the first speed.

8. The method of claim 6 wherein:

moving air flow through the dehumidifier at the first volumetric flow rate includes directing air flow into thermal contact with a moisture removal device in the dehumidifier, with the air flow having a first dwell time at the moisture removal device; and changing from the first volumetric flow rate to the second non-zero volumetric flow rate includes directing air flow into thermal contact with the moisture removal device, with the air flow having a second dwell time that is greater than the first dwell time.

9. The method of claim 6 wherein:

moving air flow through the dehumidifier at the first volumetric flow rate while the operational condition of the dehumidifier includes the first humidity value includes moving air flow at the first volumetric flow rate while a moisture removal device of the dehumidifier is operating at a first temperature; and changing from the first volumetric flow rate to the second non-zero volumetric flow rate includes reducing the first volumetric flow rate to the second volumetric flow rate in response to the temperature of the moisture removal device decreasing to a second temperature.

10. The method of claim 6 wherein:

moving air flow through the dehumidifier at the first volumetric flow rate while the operating condition of the dehumidifier includes the first humidity value includes directing air flow while air flow has a first specific humidity at an outlet of the dehumidifier; and changing from the first volumetric flow rate to the second non-zero volumetric flow rate includes reducing the first volumetric flow rate to the second volumetric flow rate in response to the specific humidity of air flow decreasing to a second specific humidity at the outlet of the dehumidifier.

11. The method of claim 6 wherein the threshold humidity value is less than about 45 GPP.

12. A method of controlling air flow through a dehumidifier, the method comprising:

moving air flow through the dehumidifier at a first volumetric flow rate while a humidity of ambient air surrounding the dehumidifier has a first humidity value;

determining a change in the humidity from the first humidity value to a second humidity value that is less than the first humidity value and below a threshold humidity value; and in response to the change in humidity, automatically moving air flow through the dehumidifier at a second non-zero volumetric flow rate that is less than the first volumetric flow rate.

13. The method of claim 12 wherein moving air flow through the dehumidifier at the second volumetric flow rate includes increasing a dwell time of air flow at a moisture removal device of the dehumidifier.

14. The method of claim 12 wherein:

moving air flow at the first volumetric flow rate includes directing air flow through the dehumidifier with an impeller rotating at a first rotational speed; and moving air flow at the second volumetric flow rate includes directing air flow with the impeller rotating at a second rotational speed that is less than the first rotational speed.

15. The method of claim 12 wherein the threshold humidity value is less than about 45 GPP.

16. A method of increasing performance of a dehumidifier, the method comprising:

rotating an air mover in the dehumidifier at a first speed to move air flow through the dehumidifier at a first volumetric flow rate;

monitoring a humidity of ambient air surrounding the dehumidifier; and in response to a decrease of the humidity of the ambient air below a predetermined humidity level, automatically rotating the air mover at a second speed that is slower than the first speed to move air flow through the dehumidifier at a second volumetric flow rate that is less than the first volumetric flow rate.

17. The method of claim 16 wherein:

rotating the air mover at the first speed removes moisture from the air flow at a moisture removal rate; and rotating the air mover at the second speed at least maintains the moisture removal rate at the predetermined humidity level.

18. The method of claim 16 wherein:

rotating the air mover moves air flow across a moisture removal device in the dehumidifier; and monitoring the humidity includes monitoring a temperature of the moisture removal device, wherein the temperature of the moisture removal device corresponds to the humidity of the ambient air.

19. The method of claim 16 wherein the predetermined humidity level is less than about 45 GPP.

20. A dehumidifier comprising:
a moisture removal device positioned along an air flow path to remove moisture from air flow through the dehumidifier;
an air mover positioned to direct air flow through the dehumidifier along the air flow path and into thermal communication with the moisture removal device; and
a controller coupled to the air mover, wherein the controller is configured to automatically operate the air mover to direct air flow at a first volumetric flow rate while the dehumidifier is at a first operating condition that corresponds to a first humidity and a reduced second volumetric air flow rate in response to a change from the first operating condition to a second operating condition corresponding to a second humidity below a threshold humidity value.

21. The dehumidifier of claim 20, further comprising a sensor that measures a temperature of the moisture removal device, and wherein the first operating condition is a first temperature of the moisture removal device and the second operating condition is a second temperature of the moisture removal device.

22. The dehumidifier of claim 20 wherein the moisture removal device is an evaporator and the air mover is an impeller.

23. The dehumidifier of claim 20 further comprising a computer readable medium storing instructions thereon that, when executed by the controller, operate the air mover at the first and second speeds.

24. The dehumidifier of claim 20 wherein the threshold humidity value is less than about 45 GPP.

* * * * *